R. W. CURRIER.
Thrashing Machine.
No. 926.
Patented Sept. 17, 1838.
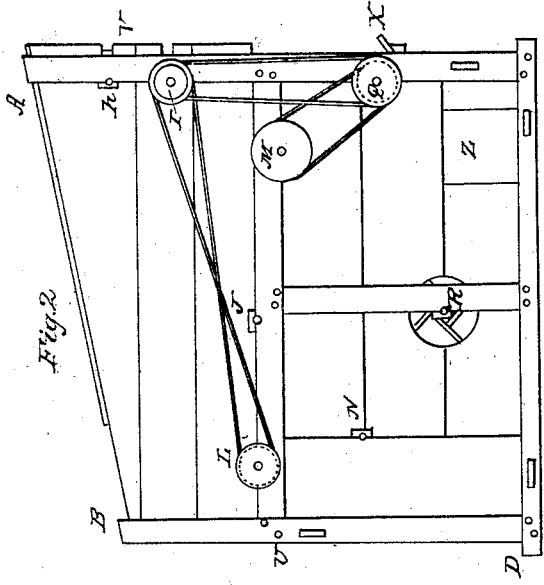
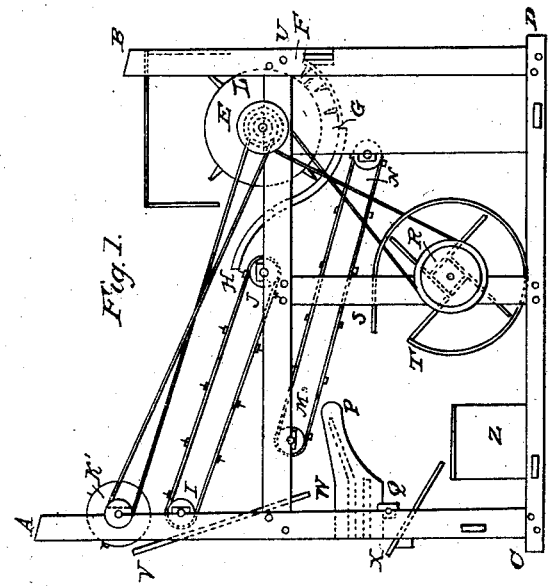
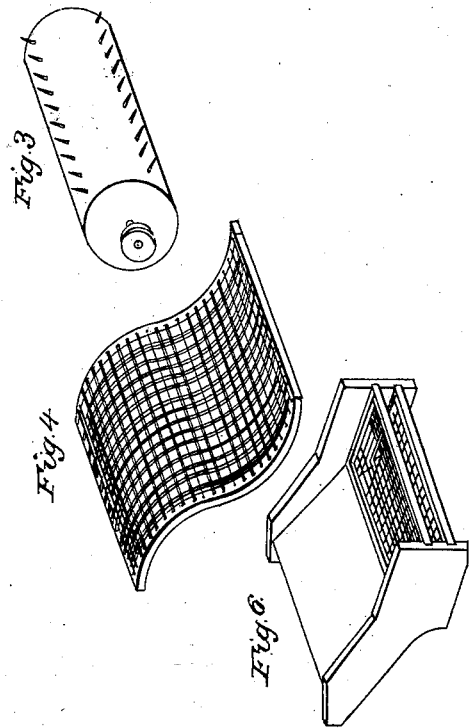
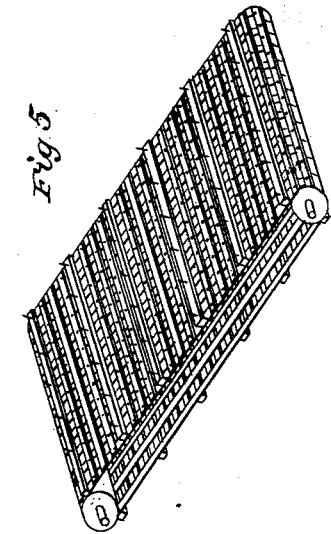

UNITED STATES PATENT OFFICE.

REUBEN W. CURRIER, OF EAST KINGSTON, NEW HAMPSHIRE.

MACHINE FOR THRESHING AND WINNOWING GRAIN.

Specification of Letters Patent No. 926, dated September 17, 1838.

*To all whom it may concern:*

Be it known that I, REUBEN W. CURRIER, of East Kingston, in the county of Rockingham and State of New Hampshire, have invented a new and Improved Machine for Threshing, Separating, and Winnowing Various Kinds of Grain, and that the following is an exact description of said machine as invented or improved by me.

A strong frame six feet long, five feet high is made of timber, side views of which, are represented in the drawings, A, B, C, D, Figures 1, and 2. A threshing cylinder, E, Fig. 1, (to which figure, I would be understood to refer generally in this description) has four rows of pointed iron teeth or beaters, projecting from its periphery; and on each end of the shaft thereof is a pulley, by one of which the cylinder is put in motion, by a belt or band connected with any moving power; and from each of which, the motion is communicated by bands to the several moving parts of the machine, as hereinafter described. A concave, F, G, is placed under and parallel to the threshing cylinder, and from which two or three rows of pointed iron teeth project upward. A conductor, consisting of a square frame, curving reversely in the form of the letter S, and covered with coarse wire gauze or netting, extends from G to H, (also represented in Fig. 4,) and serves to conduct the straw from the threshing cylinder to a straw-carrying belt, which passes over the small cylinders, or rollers I and J; also to let the grain through on the belt M, N. This belt or carrier, (which is also represented by Fig. 5) is composed of leather, perforated with holes half an inch in diameter, (or of strips of leather half an inch wide crossing each other at right angles.) and having small bars of wood attached extending crosswise, from each of which a row of pins project outward. By this belt the straw is carried from the conductor, G, H, to the discharging cylinder K, which has four rows of teeth, (as shown in Fig. 3,) and is put in motion by a band extending from the pulley L, on the first shaft. Another belt passes over the cylinders M and N, and is termed the grain carrier. This belt is composed of cloth or canvas, and has strips or bars of wood attached similar to those on the first belt, or straw carrier; and carries the grain to the sifting frame O, (also represented by Fig. 6). The sifting frame contains two sieves, and is secured by a horizontal rod which passes through it at P, and rests on a square iron shaft at Q, which gives the sifting frame a vertical vibratory motion. A fan-wheel R, of the ordinary construction, inclosed in a hoop S, T, of sheet iron, is put in motion by a band direct from the pulley L, and fans the chaff from the grain. Thus the grain, which with the straw, enters the machine at U, is separated by the process, and being prevented by the board V, W, from escaping, is eventually conducted by the board X, Y, to the receiving box Z.

Motion is communicated to the straw carrier, the grain carrier, and the square shaft, by means of the several bands which connect the pulleys L and J, I and Q, and Q and M, as represented in Fig. 2.

I claim as my invention—

The construction and application of the conductor, Fig. 4; in combination with the two carrying belts; in the manner and for the purpose described.

REUBEN W. CURRIER.

Witnesses:
RUFUS BROWN,
JESSE W. SKAAR.